United States Patent [19]

Miller et al.

[11] 4,335,201

[45] Jun. 15, 1982

[54] ANTISTATIC COMPOSITIONS AND ELEMENTS CONTAINING SAME

[75] Inventors: Donald N. Miller, Penfield; Richard A. Kydd, Rochester, both of N.Y.

[73] Assignee: Eastman Kodak Company, Rochester, N.Y.

[21] Appl. No.: 209,554

[22] Filed: Nov. 24, 1980

[51] Int. Cl.[3] .......................... G03C 1/84; G03C 1/38; C09K 3/16

[52] U.S. Cl. .................................... 430/527; 430/528; 430/529; 430/631; 430/636; 106/125; 260/DIG. 15; 260/117; 252/8.6

[58] Field of Search ............... 430/527, 631, 528, 529, 430/635, 636, 961; 252/8.6; 260/DIG. 15, 117; 57/901; 106/125

[56] References Cited

U.S. PATENT DOCUMENTS

| | | | |
|---|---|---|---|
| 584,862 | 6/1897 | Eastman . | |
| 2,725,297 | 11/1955 | Morey . | |
| 3,437,484 | 4/1969 | Nadeau . | |
| 3,514,289 | 5/1970 | Goffe | 430/631 |
| 3,525,621 | 8/1970 | Miller . | |
| 3,630,740 | 12/1971 | Joseph et al. . | |
| 3,753,716 | 8/1973 | Ishihara | 430/527 |
| 3,754,924 | 8/1973 | DeGeest et al. . | |
| 3,850,642 | 11/1974 | Bailey, Jr. et al. . | |
| 3,884,699 | 5/1975 | Cavallo et al. . | |
| 3,888,678 | 6/1975 | Bailey, Jr. et al. . | |
| 4,175,969 | 11/1979 | Mackey | 260/DIG. 15 |
| 4,267,265 | 5/1981 | Sugimoto et al. | 430/631 |

FOREIGN PATENT DOCUMENTS

| | | | |
|---|---|---|---|
| 38-17896 | 1/1963 | Japan | 252/8.6 |
| 1118324 | 7/1968 | United Kingdom . | |

OTHER PUBLICATIONS

*Research Disclosure,* publication 16630, Feb., 1978.

*Primary Examiner*—Mary F. Downey
*Attorney, Agent, or Firm*—J. Lanny Tucker

[57] ABSTRACT

Photographic base elements and radiation-sensitive elements are protected against the adverse effects resulting from accumulation of static electrical charges by incorporating therein an antistatic layer. Such layer is prepared from a coating composition comprising a hydrophilic binder, an anionic fluorinated surfactant and an inorganic nitrate.

19 Claims, No Drawings

ANTISTATIC COMPOSITIONS AND ELEMENTS CONTAINING SAME

FIELD OF THE INVENTION

This invention relates in general to photography and in particular to improved radiation-sensitive elements containing a novel antistatic layer. More specifically, this invention relates to a novel antistatic coating composition and to its use in providing protection from the adverse effects of static for photographic bases and radiation sensitive photographic elements, such as photographic papers and films.

BACKGROUND OF THE INVENTION

The accumulation of static electrical charges on photographic films and photographic papers has long been a serious problem in the photographic arts. These charges arise from a variety of factors during the manufacture, handling and use of radiation-sensitive, image-recording materials. For example, they can occur on photographic sensitizing equipment and on slitting and spooling equipment, and can arise when the paper or film is unwound from a roll or as a result of contact with transport rollers. The generation of static is affected by the conductivity and moisture content of the photographic material and by the atmospheric conditions under which the material is handled. The degree to which protection against the adverse effects of static is needed is dependent on the nature of the particular radiation-sensitive element. Thus, elements utilizing high speed emulsions have a particularly acute need for antistatic protection. Accumulation of static charges can cause irregular fog patterns in a photographic emulsion layer and this is an especially severe problem with high speed emulsions. Static charges are also undesirable because they attract dirt to the photographic recording material and this can cause repellency spots, desensitization, fog and physical defects.

To overcome the adverse effects resulting from accumulation of static electrical charges, it is conventional practice to include an antistatic layer in radiation-sensitive elements. Typically, such antistatic layers are composed of materials which dissipate the electrical charge by providing a conducting pathway. A large number of different materials have been proposed heretofore for use in antistatic layers of photographic elements. For example, U.S. Pat. No. 584,862 (issued June 22, 1897 to Eastman) describes the addition of potassium nitrate to a gelatin layer on the film support to prevent static discharges. Further, U.S. Pat. No. 3,754,924 (issued August 28, 1973 to DeGeest et al) relates to photographic elements having antistatic layers comprising a fluorinated surfactant and solid water-insoluble discrete particles of a matting agent, such as silica.

In U.S. Pat. Nos. 3,850,642 (issued Nov. 26, 1974 to Bailey, Jr. et al) and 3,888,678 (issued June 10, 1975 to Bailey, Jr. et al), radiation-sensitive elements are disclosed which have adjusted surface impact charging characteristics due to the incorporation of a charge control agent in surface layers. Useful charge control agents include cationic fluorinated surfactants. The described elements can also contain soluble salts, e.g. chlorides, nitrates, etc.

Radiation-sensitive elements provided with antistatic layers as described in the art have suffered from one or more significant disadvantages. For example, in certain instances, the antistatic layer has provided inadequate protection against static for high speed emulsions, such as those used in phototypesetting papers. Hence, there has been an unacceptable level of defects in such elements caused by static discharge. Clearly, there is a need in the art for antistatic compositions which provide improved protection from static for radiation-sensitive elements.

SUMMARY OF THE INVENTION

This invention provides a novel coating composition for use in forming an antistatic layer in a radiation sensitive element. Such composition comprises an aqueous solution of a hydrophilic binder, an anionic fluorinated surfactant and an inorganic nitrate.

This invention also provides a photographic base element comprising a support coated with an antistatic layer of the coating composition just described.

Further, this invention provides a radiation-sensitive element comprising a support; a radiation-sensitive, image-forming layer on one side of the support; and an antistatic layer of the coating composition described hereinabove on the other side of the support.

Further still, this invention provides a method of providing antistatic protection for a radiation-sensitive element. Such method comprises coating a surface of the element with the antistatic coating composition described hereinabove, and drying the resulting coating.

While anionic fluorinated surfactants and inorganic nitrates have individually been used heretofore to provide static protection for radiation-sensitive elements, in the present invention the anionic fluorinated surfactant and inorganic nitrate are employed in combination. This combination of materials has been unexpectedly found to provide an antistatic layer which has highly improved static protection properties. Such improved protection is significantly greater than either the protection provided by each component individually or the additive effect of the sum of their individual protection.

Moreover, the antistatic layers described herein provide important advantages, including the advantage that it can be coated from aqueous solution and the fact that it is durable, strongly adherent to the support, abrasion-resistant and non-tacky. Consequently, it does not contaminate equipment employed in manufacturing the radiation-sensitive elements nor processing baths or equipment used in processing the radiation-sensitive elements.

DETAILED DESCRIPTION OF THE INVENTION

Any anionic fluorinated surfactant can be used in the coating composition and elements of this invention as long as it is compatible with the other components in such compositions and does not adversely affect the sensitometric properties of any radiation-sensitive layers in such elements. As used in this specification and in the claims, the term "surfactant" refers to a surface-active substance which alters (usually reduces) the surface tension of water. Such compounds are sometimes known as surface active agents. Useful anionic fluorinated surfactants include those described in U.S. Pat. No. 3,754,924 (issued Aug. 28, 1973 to DeGeest et al), the disclosure of which is incorporated herein by reference. Generally, such surfactants are either water soluble or water dispersible.

Particularly useful anionic fluorinated surfactants are those of the formula R—X wherein R is a partly or wholly fluorinated hydrocarbon wherein some or all of the hydrogen atoms are replaced by fluorine atoms. Such hydrocarbons include alkyl, typically of from 1 to 30 carbon atoms; cycloalkyl, typically of from 5 to 30 carbon atoms; and aryl, typically of from about 6 to 30 carbon atoms. In the formula above, X is a hydrophilic anionic group, such as —$SO_3M$, —$OSO_3M$ or —COOM. M is a monovalent cation, such as hydrogen; an alkali metal ion, such as $Na^+$ and $K^+$; ammonium ion or an organic ammonium group such as diethanolammonium, morpholinium, pyridinium, tetramethylammonium and tetraethylammonium.

In a preferred embodiment, in the formula R—X, R is partly or wholly fluorinated alkylene of from 6 to 30 carbon atoms and X is —$SO_3M$. Particularly useful surfactants are of the formula $CF_3(CF_2)_7SO_3M$. Mixtures of anionic fluorinated surfactants can be used if desired.

Generally, the inorganic nitrates useful in the compositions and elements of this invention are any of the water soluble or water dispersible salts of nitric acid. Typical salts include ammonium nitrate and metal nitrates, such as aluminum nitrate, alkali metal nitrates and alkaline earth metal nitrates. Preferred nitrates are the alkali metal nitrates, such as lithium nitrate, sodium nitrate and potassium nitrate and alkaline earth metal nitrates, such as calcium nitrate and magnesium nitrate. Mixtures of nitrates can be used if desired.

The antistatic coating compositions of this invention also contain one or more water-soluble, film-forming hydrophilic binders. Suitable hydrophilic binders include both naturally occurring substances such as proteins, protein derivatives, cellulose derivatives, e.g. cellulose esters, gelatin, gelatin derivatives, polysaccharides, collagen derivatives; and synthetic hydrophilic polymeric materials. Examples of useful hydrophilic binders are described, for example, in *Research Disclosure,* publication 17643, December, 1978, p. 26, paragraph IX (published by Industrial Opportunities, Ltd., Homewell, Havant Hampshire P09 1EF United Kingdom) and U.S. Pat. No. 4,196,001 (issued Apr. 1, 1980 to Joseph et al). A particularly useful binder is gelatin.

The proportions of the components making up the antistatic coating compositions of this invention can be varied widely to meet the requirements of the particular element which is to be provided with antistatic protection. Typically, the anionic fluorinated surfactant is present in such compositions in an amount in the range of from about 0.05 to about 5 percent, by weight, based on total dry solids content of the composition. The inorganic nitrate is typically employed in an amount in the range of from about 5 to about 20 percent, by weight, based on the total dry solids content of the composition. The hydrophilic binder is typically present in an amount in the range of from about 30 to about 95 percent, by weight, based on the total dry solids content of the composition.

The antistatic coating compositions of this invention can contain other ingredients in addition to binders, anionic fluorinated surfactants and inorganic nitrates. For example, they can contain matting agents, such as silica, starch, titanium dioxide, polymeric beads, zinc oxide and calcium carbonate. Preferably, they contain silica. They can also contain coating aids, such as alcohols and surfactants, as long as they are compatible with the anionic fluorinated surfactants; hardeners, such as formaldehyde; and other addenda commonly employed in such compositions.

Photographic base elements which can be protected from the adverse effects of static with the antistatic layers described herein include photographic films prepared from a variety of support materials. For example, the film support can be cellulose nitrate film, cellulose acetate film, polyvinyl acetal film, polycarbonate film, polystyrene film, or polyester film. Polyester films, such as biaxially stretched, heat-set and heat-relaxed polyethylene terephthalate film, are especially useful. Photographic papers, especially those coated on one or both sides with a coating of a hydrophobic polymeric material, are also advantageously protected against static with the antistatic layers of this invention. Such polymer-coated photographic papers are well known and include papers coated with styrene polymers, cellulose ester polymers, linear polyesters, and polyolefins such as polyethylene or polypropylene.

The antistatic layers of this invention are usefully employed in radiation-sensitive elements intended for use in both black-and-white and color photography. In addition to the antistatic layer and one or more radiation-sensitive, image-forming layers, the radiation-sensitive elements can include subbing layers, pelloid protective layers, filter layers, antihalation layers, and so forth. The radiation-sensitive, image-forming layers present in the elements can contain any of the conventional silver halides as the radiation-sensitive material, for example, silver chloride, silver bromide, silver bromoiodide, silver chlorobromide, silver chloroiodide, silver chlorobromoiodide, and mixtures thereof. Typically, these emulsion layers also contain a hydrophilic colloid. Illustrative examples of such colloids are proteins such as gelatin, protein derivatives, cellulose derivatives, polysaccharides such as starch, sugars such as dextran, plant gums, and synthetic polymers such as polyvinyl alcohol, polyacrylamide and polyvinylpyrrolidone. Conventional addenda such as antifoggants, stabilizers, sensitizers, development modifiers, developing agents, hardeners, plasticizers, coating aids, and so forth, can also be included in the photographic emulsion layers. The photographic elements protected with the antistatic layer of this invention can be films or papers sensitized with a black-and-white emulsion, elements designed for reversal color processing, negative color elements, color print materials, and the like.

Typical photographic silver halide emulsions, preparations, addenda, and processing techniques useful for the elements of this invention are described, for example, in *Research Disclosure,* publication 17643, December, 1978, pp. 22-31, noted hereinabove.

The antistatic coating compositions of this invention can be applied by any suitable technique for the application of aqueous coating compositions. For example, it can be coated by spray coating, dip coating, swirl coating, extrusion hopper coating, curtain coating, air knife coating, or other coating techniques. The thickness of the coated layer will depend upon the particular requirements of the photographic element involved. Typically, the dry weight coverage is in the range from about 0.2 to about 4 grams per square meter and most usually in the range from about 1 to about 3 grams per square meter. Drying of the coated layer can be carried out over a wide range of temperatures, for example, at temperatures of from about 20° C. to about 130° C. and preferably from about 75° C. to about 115° C.

When the antistatic coating composition of this invention is applied to a polyolefin coated paper support, it is advantageous to treat the polyolefin surface, by a suitable method such as corona discharge, ozone or flame treatment, to render it receptive to the coating compositions. It can also be advantageous for the paper which is used to prepare the support to be tub sized with a solution of a conducting salt which acts as an internal antistat. It is also advantageous to employ paper stock containing at least 3%, and generally from about 4 to about 8% (by weight), moisture.

When the antistatic coating composition of this invention is applied to a polyester film support, a subbing layer is advantageously employed to improve the bonding of the antistatic layer to the support. Useful subbing compositions for this purpose are well known in the art and include, for example, interpolymers of vinylidene chloride such as vinylidene chloride/acrylonitrile/acrylic acid terpolymers or vinylidene chloride/methyl acrylate/itaconic acid terpolymers.

The antistatic layers of this invention can be incorporated at any position within a photographic element to provide effective protection against the adverse effects of static. However, they will ordinarily be employed as the outermost layer of the element on the side opposite the radiation-sensitive photographic emulsion layers.

The invention is further illustrated by the following examples of its practice.

EXAMPLE 1

An antistatic coating composition according to this invention was prepared by adding the following components to sufficient water to give about 3.8% solids:

| | parts* |
|---|---|
| gelatin (91% solids) | 78.69 |
| Alkanol$^{TM}$-XC surfactant*** (10% solids) | 0.52 |
| Fluortenside$^{TM}$ FT-248** (2% solids) | 0.08 |
| $NaNO_3$ | 12.06 |
| $Al(NO_3)_3$ (25% solids) | 0.79 |
| silica | 7.34 |
| formaldehyde (40% solids) | 0.52 |

*parts per 100 parts solids
**anionic fluorinated surfactant available commercially from Bayer AG
***salt of a naphthalene sulfonate Control antistatic compositions A, B and C were also prepared having the following distinctions compared to the antistatic composition of this invention described hereinabove:

| | |
|---|---|
| Control A | Fluortenside$^{TM}$ FT-248 omitted |
| Control B | $NaNO_3$ and $Al(NO_3)_3$ omitted |
| Control C | Fluortenside$^{TM}$ FT-248, $NaNO_3$ and $Al(NO_3)_3$ omitted |

Photographic base elements were prepared by applying each of the antistatic compositions (Example 1 and Controls A–C) to polyethylene-coated paper support in an amount sufficient to provide dry weight coverages ranging from about 1 to about 2 grams per square meter of support.

The antistatic properties of the antistatic compositions of this invention can be evaluated by any suitable technique. The method used in this Example is identified as the "impact electrification" method. An instrument to measure "impact electrification" and its use are described in U.S. Pat. Nos. 3,501,653 (issued Mar. 17, 1970 to Bailey, Jr.) and 3,850,642 (issued Nov. 26, 1974 to Bailey, Jr. et al).

In this Example, the charge generated (microcoulombs/square meter) when each photographic base element was brought into contact with a polyurethane elastomer was measured. The results are listed in Table I.

TABLE I

| | Charge (microcoulombs/square meter) |
|---|---|
| Example 1 | +27 |
| Control A | +82 |
| Control B | +63 |
| Control C | +86 |

These results were evaluated to determine if the charging effect of the nitrates and the anionic fluorinated surfactant were additive or unexpectedly greater than additive. This evaluation was made by comparing the responses, as follows:

C−B=change in electrification level between Controls B and C;

C−A=change in electrification level between Controls A and C;

(C−B)+(C−A)=total theoretical effect assuming additive effects;

C−1=actual change in electrification level between Control C and Example 1.

C−1 was then compared to [(C−B)+(C−A)] by subtracting the latter from the former. This difference between actual and theoretical additive effects was determined to be $+59-[(23)+(+4)]=+59-[27]=+32$. This result indicates that the antistatic effect of combining the nitrates with the anionic fluorinated surfactant was significantly greater than the sum of the effects of using each individually.

EXAMPLE 2

The same experimentation was carried out as in Example 1 except that silica was omitted from all antistatic compositions.

The results of the "impact electrification" tests are listed in Table II.

TABLE II

| | |
|---|---|
| Example 2 | −15 |
| Control A | +85 |
| Control B | +58 |
| Control C | +81 |

A similar comparison of the actual and theoretical additive effects was then made as in Example 1. The difference between actual and theoretical additive effects was found to be +77. This indicates that the unexpected improvement in antistatic protection with the compositions of this invention is not due to the presence of silica in such compositions.

This invention has been described in detail with particular reference to certain preferred embodiments thereof, but it will be understood that variations and modifications can be effected within the spirit and scope of the invention.

What is claimed is:

1. A coating composition for use in forming an antistatic layer in a radiation sensitive element, said composition comprising an aqueous solution of:

(a) a hydrophilic binder;

(b) an anionic fluorinated surfactant; and (c) an inorganic nitrate.

2. The composition of claim 1 wherein said anionic fluorinated surfactant has the formula R—X wherein R is partly or wholly fluorinated hydrocarbon; and X is —$SO_3M$, —$OSO_3M$ or —COOM wherein M is a monovalent cation.

3. The composition of claim 2 wherein R is partly or wholly fluorinated alkylene and X is —$SO_3M$.

4. The composition of claim 1 wherein said nitrate is an alkali metal nitrate.

5. The composition of claim 1 wherein said anionic fluorinated surfactant is present in an amount in the range of from about 0.05 to about 5 percent, by weight, and said inorganic nitrate is present in an amount in the range of from about 5 to about 20 percent, by weight, both based on total dry solids content of said composition.

6. The coating composition of claim 1 additionally containing silica.

7. A photographic base element comprising a support coated with an antistatic layer, said antistatic layer comprising:

(a) a hydrophilic binder;

(b) an anionic fluorinated surfactant; and (c) an inorganic nitrate.

8. The base element of claim 7 wherein said support is a film support.

9. The base element of claim 7 wherein said support is a paper support.

10. The base element of claim 9 wherein said support is a polyolefin-coated paper support.

11. A radiation-sensitive element comprising:

(1) a support, (2) a radiation-sensitive, image-forming layer on one side of said support; and (3) an antistatic layer on the other side of said support, said antistatic layer comprising:

(a) a hydrophilic binder;

(b) an anionic fluorinated surfactant; and (c) an inorganic nitrate.

12. The radiation-sensitive element of claim 11 wherein said support is a polyolefin-coated paper support.

13. The radiation-sensitive element of claim 11 wherein said radiation-sensitive, image-forming layer is a photosensitive silver halide emulsion layer.

14. The radiation-sensitive element of claim 11 wherein said anionic fluorinated surfactant has the formula R—X wherein R is partly or wholly fluorinated alkylene; and X is —$SO_3M$, —$OSO_3M$ or —COOM wherein M is a monovalent cation.

15. The radiation-sensitive element of claim 14 wherein said anionic fluorinated surfactant has the formula $CF_3(CF_2)_7SO_3M$.

16. The radiation-sensitive element of claim 11 wherein said inorganic nitrate is an alkali metal nitrate.

17. The radiation-sensitive element of claim 16 wherein said inorganic nitrate is sodium nitrate.

18. A method of providing antistatic protection for a radiation sensitive element, which method comprises coating a surface of said element with an antistatic coating composition and drying said coating, said antistatic composition comprising:

(a) a hydrophilic binder;

(b) an anionic fluorinated surfactant; and (c) an inorganic nitrate.

19. A photographic element comprising:

(1) a support;

(2) a photosensitive image-forming layer on one side of said support; and (3) an antistatic layer on the other side of said support, said antistatic layer comprising:

(a) gelatin;

(b) an anionic fluorinated surfactant having the formula $CF_3(CF_2)_7SO_3M$ wherein M is a monovalent cation; and (c) an inorganic nitrate.

* * * * *